United States Patent Office 3,484,305
Patented Dec. 16, 1969

3,484,305
NONBUBBLING DISPERSION STRENGTHENED LEAD
Michael V. Rose, Sewickley, Robert S. Bowman, Pittsburgh, and James H. Kanzelmeyer, Aliquippa, Pa., assignors to St. Joseph Lead Company, New York, N.Y., a corporation of New York
No Drawing. Filed Mar. 25, 1966, Ser. No. 537,318
Int. Cl. C23c 13/04
U.S. Cl. 148—6.3                    8 Claims

ABSTRACT OF THE DISCLOSURE

Lead particles for the production of dispersion strengthened lead products capable of being hot worked without substantial gas evolution are made by admixing a solid substance with lead particles not exceeding about 150 microns in particle size in an atmosphere substantially free of at least one of carbon dioxide and water. The added substance may be lead oxide added by subjecting the lead particles to an oxygen-containing atmosphere or may be other solid substances insoluble in lead, such as alumina, magnesia, lime, or metals or metal alloys such as copper, cobalt, nickel and iron-cobalt alloys or carbon.

---

This invention relates to nonbubbling dispersion strengthened lead and to methods of making it.

It is known that the physical properties of lead may be enhanced markedly by dispersing within the lead insoluble particles of solid substances such as an oxide or oxides of lead or other oxides, such as alumina, magnesia, lime, metals or metallic alloys such as copper, cobalt, nickel and iron-cobalt alloys, and carbon. A practical range for such additions is in the amount of from about 0.5% to 16% by weight. In general the added substances are coated on or admixed with lead particles not more than about 150 microns and preferably not over 20 microns in average particle size. A body of the lead particles containing such admixtures or coatings is then subjected to plastic deformation, for example, by rolling or extrusion to comminute the solid substance and to disperse the comminuted substance in the lead matrix.

Of particular interest are the lead products obtained by dispersing within the lead insoluble particles of an oxide or oxides of lead. This may be accomplished by subjecting finely divided lead to conditions under which a coating of oxide is formed on the surface of the lead particles as by atomizing molten lead in an oxidizing atmosphere, such as air, or by subjecting lead particles to the action of an oxidizing gas under controlled conditions, for example, by stirring the lead particles in air in the presence of controlled amounts of moisture in a pan mixer, a double cone mixer or the like. A body of thus treated lead particles is then subjected to plastic deformation, for example, by rolling or extrusion to comminute the lead oxide coating thereon and to disperse the comminuted lead oxide in the lead matrix.

In general, the oxide-coated lead particles should not exceed about 150 microns in size and preferably should not exceed an average particle size of about 20 microns and the surface coating of lead oxide should be in the range of from about 0.5% to about 16% by weight calculated as PbO.

In the known methods of manufacturing dispersion strengthened lead, there inevitably occurs a greater or less take-up of carbon dioxide and water vapor which in turn leads to the presence of various amounts and forms of carbonate and hydrated compounds on the surface of the lead particles. When the resulting specimens of dispersion strengthened lead are heated above some critical temperature, there is observed to occur a bubbling or disturbing action which, it has been discovered, is caused by release of internally generated and entrapped gases. These gases arise from expansion of entrapped air and decomposition of lead compounds other than lead oxide under the influence of heat. Whatever the actual cause for the gas generation may be, the practical fact is that this phenomenon causes difficulty in hot working, for example rolling, forging and extrusion where heat is generated during processing or where the material is preheated prior to being subjected to the working process, and more importantly, it imposes drastic restrictions on the joinability of dispersion strengthened lead parts by conventional welding techniques. Heating of the areas to be joined induces the bubbling phenomenon and leads to an incomplete closure of the joint. Such an imperfect joint may suffer corrosion in certain uses, for example, where a dispersion strengthened lead sheet is used as a plate in a storage battery with a sulfuric acid anolyte.

We have found that the evolution of gas during the hot working of dispersion strengthened lead can be substantially eliminated by carrying out the coating of or admixing with the lead particles of substances to be dispersed therein in the substantial absence of carbon dioxide or water or both. Since water vapor accelerates the absorption of oxygen but is only very slightly absorbed in the absence of carbon dioxide, it is in general advantageous to operate in substantially carbon dioxide free atmospheres. The partial pressure of carbon dioxide in the atmosphere in which the substance to be dispersed in the lead is added thereto or formed thereon should not exceed about 2 mm. of Hg and preferably is substantially lower, particularly when any substantial amount of water vapor is present.

In the oxidation of preformed lead particles by the method of the invention a temperature in the range of from about 100° C. to about 350° C. is preferred. When the oxidation is carried out during atomization of the lead the temperature of the gas into which the lead is atomized may be in the same range or may extend from as low as 25° C. to above the melting point of lead.

Lead particles having a partial but insufficient coating of lead oxide, and contaminated by hydroxyl (OH), carbonate ($CO_3$) or other groups capable of evolving water or carbon dioxide on heating may be effectively treated by heating, preferably under vacuum, to a temperature of from about 280° C. to just below the melting point of the lead particles and thereafter subjecting the particles to an oxidizing atmosphere substantially free from carbon dioxide or water or both.

For example, lead powder having an average particle size of about 10 microns and a surface oxide content of about 2.8% calculated as PbO is heated under a vacuum of about $10^{-3}$ mm. of Hg to 300–310° C. for two hours and thereafter cooled to 100° C. under vacuum. When oxidized in dry carbon dioxide-free air for one hour at 100° C. the lead powder absorbs about 0.05 cc. of oxygen per gram. When oxidized under the same conditions with carbon dioxide-free air containing water vapor at a partial pressure of 14 mm. of Hg under standard conditions about 0.12 cc. of gas per gram of powder is absorbed of which only about 0.008 cc. per gram is given off when the powder is reheated to 335° C. The resulting powders when compacted, for example, under a pressure of 60,000 p.s.i. and extruded into shaped members give satisfactory welds by conventional welding methods.

The oxide coated lead particles obtained by the method of the invention are compacted and then subjected to plastic deformation, for example, by rolling or extrusion to comminute the coating and disperse it in the lead matrix. The products of the invention may be marketed in the form of the oxide or otherwise coated particles or in the form of rolled, extruded or otherwise shaped articles. Such articles may be hot-rolled or fusion welded without any indication of bubbling or development of porosity.

We claim:

1. A method of making lead particles for the production of lead products strengthened by the dispersion of solid substances therein and capable of being hot worked without substantial gas evolution which comprises adding an insoluble solid substance to lead particles not exceeding about 150 microns in particle size by admixing the substance with or coating the substance on the particles in an atmosphere free of at least one of carbon dioxide and water.

2. A method of making lead particles for the production of lead products strengthened by the dispersion of lead oxide therein and capable of being hot worked without substantial gas evolution which comprises subjecting lead particles not exceeding about 150 microns in particle size to the action of an oxygen-containing atmosphere free of at least one of carbon dioxide and water.

3. A method of defined in claim 2 wherein the atmosphere is free of carbon dioxide.

4. A method as defined in claim 2 wherein the atmosphere is free of water.

5. A method as defined in claim 2 wherein the temperature of the metal-gas atmosphere interface is in the range from about 100° C. to about 350° C.

6. A method as defined in claim 2 wherein the average size of the lead particles does not exceed about 20 microns.

7. A method as defined in claim 2 wherein lead is atomized in an atmosphere free of at least one of carbon dioxide and water.

8. A method as defined in claim 2 wherein the lead particles are heated to a temperature in the range from about 280° C. to just below the melting point of the lead particles prior to subjecting them to the oxygen-containing atmosphere.

References Cited

UNITED STATES PATENTS

| | | | |
|---|---|---|---|
| 1,156,079 | 10/1915 | Holley | 264—12 |
| 2,209,964 | 8/1940 | Ferguson | 264—12 |
| 3,189,989 | 6/1965 | Ebdon | 29—420.5 |
| 3,315,342 | 4/1967 | Roberts | 29—420.5 |
| 3,320,664 | 5/1967 | Krantz et al. | 29—420.5 |
| 3,346,677 | 10/1967 | Kinsell | 264—12 |

RALPH S. KENDALL, Primary Examiner

U.S. Cl. X.R.

29—192, 420.5; 117—100; 264—12